3,631,006
PROCESS FOR THE ANIONIC POLYMERIZATION
OF UNSATURATED HYDROCARBON MONOMERS
John J. Hawkins, Santa Ana, Calif., assignor to Cities
 Service Company, New York, N.Y.
No Drawing. Continuation of application Ser. No.
 484,430, Sept. 1, 1965. This application Sept. 23,
 1969, Ser. No. 860,471
Int. Cl. C08d 3/06; C08f 1/28
U.S. Cl. 260—80.7                                    5 Claims

ABSTRACT OF THE DISCLOSURE

The disclosure is concerned with a new method of effecting the anionic polymerization of polymerizable unsaturated hydrocarbon monomers, wherein a catalyst-cocatalyst combination is used. The catalyst-cocatalyst combination consists of (a) an anionic catalyst of a Group I-A or II-A metal, and (b) a compound of a Group III-A element as the cocatalyst.

---

This application is a continuation of S.N. 484,430, filed Sept. 1, 1965, now abandoned.

This invention is a method of preparing polymers, and relates to anionic or carbanionic catalysis or initiation of the polymerization of compounds containing carbon-to-carbon unsaturation, and of other polymerizable monomers.

In anionic polymerization processes, many problems and limitations have been encountered, and a variety of solutions has been proposed by prior workers. One important and well recognized problem is that of impurities in the monomer being polymerized or solvents used therewith. The difficulties engendered thereby include inactivation of the catalyst, which may require a larger proportion of catalyst, a slowing of the reaction, and where the object is to direct or control the manner in which the monomer molecules combine, that is, to form stereoregular polymers, the impurities commonly interfere.

An object of the invention is to overcome these and other difficulties and to broaden the narrow paths, limited mechanisms, and possibilities of control of the reactions which have been inherent in prior methods. Thus, the invention is an improvement in or an alternative to prior suggested solutions to the problems encountered in the art of anionic polymerization. One example of a monomer and the impurities therein will give an indication of problems which may be encountered with this and other monomers. Butadiene-1, 3 is commonly prepared by dehydrogenation of butene, followed by the formation of a crystalline complex of butadiene with cuprous ammonium acetate, separation of the complex from other materials, and heating of the complex to decompose the same and release butadiene. By this method it has been found that butadiene of a purity between about 95% and 99% is readily obtained. The impurities present in such butadiene include in most cases small amounts of isobutane and n-butane, isobutylene, trans-butene-2, cis-butene-2, propylene, propadiene, butadiene-1,2; methylacetylene, ethylacetylene, dimethylacetylene, and vinylacetylene. Hereinafter, such butadiene having small amounts of such impurities is referred to as "plant" butadiene. In addition, carbonyl compounds and water are present, and normally the butadiene contains polymerization inhibitors such as tertiary butylcatechol. This monomer and solvents used therewith also commonly contain impurities such as alcohols, amines, water, nitrogen-containing compounds, oxygen, peroxides and sulfur-containing compounds. These may also interfere with the desired course of a given polymerization reaction.

Among prior proposals for the solution to some of the problems discussed above are methods which involve purifying the monomer under non-polymerizing conditions. For example, it is known to boil the monomer under reflux at atmospheric or subatmospheric pressure, in the presence of a compound which reacts with impurities, in which method the concentration of the compound, the time of contact, and the temperature are controlled in a manner which avoids polymerization. The purified monomer is then recovered, and is then polymerized by the introduction of a polymerization catalyst and the application of suitable conditions. For example, butadiene and isoprene have been purified by contact with sodium or with a combination of compounds such as sodium and triethyl aluminum, in the absence of oxygen, by refluxing, with the time and temperature, and perhaps the ebullition of vaporized monomer, being such that polymerization is avoided. Such procedure materially adds to the expense of the monomer and the polymer since the purification method is on a par in complexity with the polymerization process itself.

Another prior method which has been proposed is the modification of a catalyst which induces anionic polymerization in such a manner that the impurities have a less serious detrimental effect upon the course of the polymerization. One such catalyst, for example, is made by reacting alkali metals, or alkali metal compounds such as alkali metal alkyl compounds, with halogenated hydrocarbons in the presence of elemental carbon.

The present invention resides in the discovery that by the utilization of particular catalyst compositions, anionically catalyzed polymerization of unsaturated monomers and other monomers may be accomplished without expensive purification procedures. This is achieved by the introduction of a compound of an element of Group III-A of Deming's Periodic Chart of the Elements, together with a conventional anionic catalyst, with the results that an expensive preliminary purification is unnecessary; the normally encountered induction period (that is, a period of contact of the monomers with the catalyst under polymerizing conditions prior to the beginning of polymerization) is reduced or eliminated; and in many cases the resulting polymer chains have a narrow molecular weight distribution and/or are stereoregular in structure. Furthermore, a co-catalytic effect is achieved which is not obtained with either one of the catalyst components alone. It is also possible to achieve more rapid polymerization of monomers which are difficult to polymerize.

In some instances the compound of the Group III-A element reacts with or forms a complex compound with a portion of these conventional anionic catalysts. In cases where impurities are present which react with a portion of one or both catalyst components, these products of such reactions are also present.

Wherever a particular group of elements is referred to herein, the periodic chart intended is that of H. G. Deming, appearing in Lange's Handbook of Chemistry, 7th edition, pages 58–59 (1949), Handbook Publishers Incorporated, Sandusky, Ohio.

While any of the known anionic polymerization catalysts are contemplated as being within the invention, a particularly preferred group of catalysts are the Group I-A and II-A metals existing as stable isotopes, and certain compounds thereof. Thus, the metals lithium, sodium, potassium, rubidium, cesium, beryllium, magnesium, calcium, strontium, and barium, as well as alloys thereof, and certain compounds thereof, are the preferred anionic catalysts according to the invention.

As has been suggested, in addition to individual metallic anionic polymerization catalysts and compounds thereof, alloys thereof are useful. For example, an alloy of lithium with up to about 10 percent sodium or potassium by weight is suitable. Another example is an alloy of up to about 50 percent calcium together with sodium or lithium. It is preferred that the metallic catalyst be finely divided, e.g., .1–50μ and suspended in liquid. Of course coarser particles such as 200μ or a metal-coated support may be used. Another way of using such catalysts is to deposit them on a support such as aluminum or calcium carbonate particles.

Particular derivatives of these metals have the formula $M(R)_x$ wherein R is an organic radical, preferably a hydrocarbyl radical, and/or a hydrogen radical, M is selected from said Group I-A and II-A metals, and $x$ is the valence of M. The given formula for the Group I-A and II-A metal derivatives includes $M_wR'$, $w$ being 1 for divalent metals and 2 for monovalent metals, and $R'$ being an organic radical, preferably a hydrocarbyl radical, where two valences of a metal M are occupied by a single radical R, e.g., $Na_2R$, MgR. Grignards, RMX, M being a divalent metal and X being halogen, are also useful. While the radical R is desirably hydrocarbyl or hydrogen, and R′ is desirably a hydrocarbyl radical, in its broader aspects the invention includes as the radical R or R′ any organo radical having the grouping $$M-\underset{|}{\overset{|}{C}}-\underset{|}{\overset{|}{C}}-\text{ and/or } M-\underset{|}{\overset{|}{C}}-H$$

In other words where the term "organometallic" is used herein, the term designates compounds in which the metal is bonded by a covalent bond to an organic carbon atom, that is, a carbon atom bonded to hydrogen and/or another carbon atom. The radical R or R′ is preferably a hydrocarbyl radical selected from group consisting of alkyl, aryl, aralkyl, alkaryl, and cycloalkyl, and having less than about twenty carbon atoms. Immediately below, where "radicals" are mentioned, the radical R or R′ is intended.

Suitable alkyl radicals include methyl, ethyl, propyl, isobutyl, n-isobutyl, ethyl, butyl, amyl, isoamyl, hexyl, heptyl, octyl, nonyl, decyl, dodecyl, pentadecyl, octadecyl, ethylene, hexamethylene, and in general any straight or branched chain alkyl or alkylene radical having less than about 20 carbon atoms, and more preferably, an alkyl radical having between 2 and about 6 carbon atoms, inclusive.

Suitable aryl radicals include phenyl, biphenyl, α-naphthyl, β-naphthyl, α-anthryl, and β-anthryl. Included among the suitable alkaryl radicals are tolyl, xylyl, 2-mesityl and duryl. Aralkyl radicals included in the invention are benzyl, phenethyl, m-methylphenyl, benzocyclohexyl, and β-naphthylmethyl. Cycloalkyl radicals are also useful and include cyclopentyl, cyclohexyl, cyclooctyl, 3-methylcyclohexyl, and 3-nitrocyclohexyl. Suitable alkenyl radicals include vinyl and allyl. Preferably the aryl and other radicals have less than about 25 carbon atoms.

Organometallic compounds of the Group I-A metals useful according to the present invention include:

phenyllithium
normal butyllithium
isobutyllithium
p-methoxyphenyllithium
benzyllithium
triphenylmethyllithium
cyclohexyllithium
tolyllithium
α-napthyllithium
n-amyllithium
hexamethylenedilithium
triphenylmethylpotassium
diphenylcyclohexylmethyl potassium
diphenylmethyl potassium
sodium napthalene ($C_{10}H_8Na_2$)
sodium+sodium isopropoxide
amyl sodium+NaCl+sodium isopropoxide
sodium+sodium dodecoxide
methylsodium
phenylsodium
n-amylsodium
ethylsodium
benzylsodium
tetraphenylenedisodium
phenylisopropylpotassium
ethylrubidium and
ethylcesium.

Examples of organometallic compounds of the Group II-A metals useful according to the invention are as follows:

dimethylberyllium
diethylberyllium
di-n-butylberyllium
ethylberyllium bromide
n-butylberyllium iodide
phenylberyllium iodide
dimethylmagnesium
diphenylmagnesium
phenylmagnesium bromide
ethylmagnesium iodide
diethylcalcium
diphenylcalcium
methylphenylcalcium
phenylcalcium iodide
diethylbarium and
diphenylstrontium.

The Group III-A organometallic compounds, the second component of the catalyst system used in the process of the present invention, are referred to herein as "cocatalysts" and include a number of useful compounds. As indicated above the phrase "organometallic," is intended to designate compounds in which an organic carbon is bonded to the metal atom. Organometallic halides, organometallic hydrides, and "organic" radicals bonded to a metal are given the same limitation. In this specification and in the claims, the term "metal" includes boron. The Group III-A compounds useful in the present invention have the empirical formula $M'R''(y-z)X_z$ wherein M′ is an element of Group III-A of the Periodic Chart, specifically, B, Al, Ga, In, and Tl, R″ is an organic radical, preferably a hydrocarbyl radical, both as defined above, X is a halide radical or the hydrogen radical, $y$ is the valence of the metal M′, $z$ is from 0 to a value equal to $y$, and when "X" is a halide radical, $z$ is 1 or 2. Useful Group III-A compounds according to the present invention include:

$B_2H_6$, diborane(6)
$B_5H_{11}$, pentaborane(11)
$CH_3BH_4$, methyltetrahydroborane
$NaBH_4$ ($B_2H_6$+Na gives this in situ)
$LiBH_4$
$(CH_3)_3B$
$(C_6H_5)_3B$, triphenylborane
$(n-C_4H_9)_3B$
trimethylborane
tri-n-butylborane
triphenylborane
diphenylboron hydride
(diethylboronhydride)$_2$
diethylcyclopentylborane
triethyl aluminum
diethylaluminum chloride
diethylaluminum iodide
triphenylaluminum
triphenylgallium
triethylgallium
triphenylindium
trimethylindium
triphenylthallium
diethylaluminumhydride
di-n-isopropyl aluminum hydride
di-n-dodecylaluminum hydride
triisopropylaluminum
diethylbenzylaluminum
cyclohexyldiethylaluminum
tri-n-hexylaluminum
diethylaluminum fluoride
diethylaluminum chloride
di-n-propylaluminum iodide,
ethylaluminum dichloride
and others.

Other cocatalysts useful with anionic polymerization catalysts according to the invention include a complex of sodium and triarylboron, sodium aluminum tetraisobutyl, sodium aluminum hydride, lithium aluminum hydride, lithium aluminum tetraethyl, sodium boron tetrabutyl, and magnesium bis(tetraethyl aluminum), lithium aluminum tetracyclopentadienyl, and others. These additional cocatalysts may be represented by the formulae $MM'H_4$, $MM'R''_4$, $M(M'R''_4)_2$ and $M(M'H_4)_2$, M being divalent in the last two instances.

The general properties and basic methods of preparing the above-described types of compounds of the metals of Groups I–A, II–A and III–A, may be found for example in Encyclopedia of Chemical Technology, Kirk-Othmer, volume 9, pages 612–642 (1952), and in Encyclopedia of Chemical Technology, Second edition, Kirk-Othmer, volume 2, pages 26–41 (1963), and volume 3, pages 707–727 (1964), and in the art cited in these publications.

The catalyst-cocatalyst combination is utilized in the polymerization of the monomers specified herein in an amount of between about .1% and about 10%, preferably between about .5% and about 5%, based on the weight of the monomer or monomers. The ratio of cocatalyst, that is, the compound of the Group III–A metal (which includes boron as indicated elsewhere herein) to the Group I–A or II–A metal or compound as the anionic polymerization catalyst is within a molar ratio of less than 1 to 1, preferably between about 1 to 6 and 1 to 100.

Preferably the polymerization is solution polymerization. Bulk polymerization, that is, polymerization in which the monomer and catalysts are substantially the sole ingredients in the reaction mixture, is also useful, as will be apparent to those skilled in the art. In solution polymerization, the solvent may serve to dissolve, or to suspend the catalyst and cocatalyst. Thus, hexane dissolves triethylaluminum, but simply suspends a finely divided sodium dispersion. Of course, a solvent should be chosen which does not inactivate the catalyst components. Preferably non-polar solvents are used. Inert hydrocarbons are well suited, and these include alkanes and cycloalkanes such as petroleum naphtha, hexane, heptane, methylcyclohexane, ethylcyclohexane, cyclooctane, octane, isooctane, cyclopentane, aromatic hydrocarbons, such as benzene, toluene, xylenes, ethyl benzenes, and other known solvents. In some cases a combination of solvents is useful; for example, where a catalyst component is difficultly soluble. Other useful solvents include the monomer itself. The solvents should be carefully chosen to avoid inactivating catalysts; for example, certain alkyl halides may react with triethylaluminum and thus should not be used with this cocatalyst. Similarly, triethylamine, ethers, alcohols, phenols, and other compounds known to be reactive with triethylaluminum and should not be used with this particular cocatalyst, as solvents. This is to be distinguished from the use of small amounts of reactive catalyst modifiers such as alcohols which may, for example, form alkali metal alkoxides.

The invention includes any monomer known to be polymerizable by the subject anionic catalysts. Some polymerizable monomers are, of course, not suitable for use with certain anionic catalysts as is well known; for example, acrylic acid and other acids simply form salts with sodium. According to the literature, homopolymers of isobutylene or vinyl ethers are similarly not obtained using sodium as a catalyst, for example.

Suitable classes of monomers include vinyl compounds, α-olefins, nitroolefins, alkenyl cyanides, alkenylidene cyanides, vinyl aromatic compounds (styrenes), $\alpha,\beta$-unsaturated nitriles, unsaturated alkyl esters of $\alpha,\beta$-unsaturated acids, aldehydes, cyclic lactams, conjugated and non-conjugated diolefinic compounds, vinylcycloalkanes, vinylcycloalkenes, acetylenes, and lactams, as homopolymers and copolymers. In general, any polymer which may be prepared by anionic or carbonionic polymerization may be prepared according to the process of the present invention.

Specific examples of monomers and polymers useful according to the invention are: ethylene, propylene, nitroethylene, vinylidene cyanide, acrylonitrile, methacrylonitrile, styrene, tetrafluoroethylene, methacrylamide, allymethacrylate, ethylacrylate, n-butylacrylate, 1,2-dihydronaphthalene, 1,4-dihydronaphthalene, 2-cyano-3-difluoropropylene, 2-cyano-2-difluoroethylene, ethylene oxide, propylene oxide, formaldehyde, epsilon-caprolactam, isopropyl acrylate, styrene; a copolymer of 10–90% ethylene, 90–10% propylene, and 0–15% of a conjugated or non-conjugated diolefin or triolefin such as butadiene-1, 3-cyclopentadiene, 1,3-cyclooctadiene, 1,5,9-cyclododecatriene, or 1,5-cyclooctadiene; a polymer of isobutylene with 0 to 10% of a diolefinic compound such as butadiene or isoprene, and 0 to 10% of a vinyl aromatic compound such as styrene; interpolymers, block polymers and graft polymers of 50–90% of a 1,3-diolefin such as butadiene, 5–40% of a nitrile such as acrylonitrile, and 5–40% of a vinyl aromatic such as styrene; 1,3-butadiene, ethylacetylene, vinyltoluene, vinylacetate, isoprene, styrene, and a copolymer of butadiene with up to 20% of a vinyl aromatic compound such as vinyltoluene or styrene and up to 20% of an α-olefin such as isobutylene.

Unless otherwise specified, where a general name for a monomer is given, the meaning common in the art is intended, for example where butadiene is stated to be a monomer undergoing polymerization, 1,3-butadiene is intended, and unless otherwise stated, it is ordinary plant butadiene of about 98% purity and having been passed through a column of silica gel to remove most of the moisture and polymerization inhibitors such as tertiary butylcatechol.

The polymerization conditions and methods of recovering the polymers vary to some extent, depending upon the nature of the monomers, catalysts and polymer. Recovery of polymer and separation of the catalyst is readily achieved in most instances simply by washing with water. Where the anionic polymerization catalyst is such that it reacts with water to form an alkaline solution, such alkaline solution is helpful in the separation of some cocatalysts containing certain of the elements of Group III–A of the Periodic Chart of the elements, such as aluminum. Other methods of purifying the polymer include washing with alcohols such as methanol, ethanol, or isopropanol, or with organic or inorganic acids such as acetic acid. Preferably where alcohols or acids are used, they are used in combination with water.

The pressure is not particularly critical although it is preferred that the reaction take place in the liquid phase. Thus, from about 1 to about 20 atmospheres has been found to be useful.

The temperature during polymerization is suitably between about −20° C. and 250° C., preferably between about 50° C. and 150° C. As is well known in anionic polymerizations, choice of the temperature depends upon the polymer properties desired as well as upon the monomers and catalysts.

The time depends somewhat upon the desired molecular weight of the polymer, and polymerization is continued until a major or preponderant proportion of the monomer is incorporated in polymeric groups or chains having at least three monomer units.

The polymerization process may be a batch method or a continuous method.

The invention will now be illustrated by examples. A more or less standard polymerization procedure for the following examples was as follows:

A small quantity of solvent (hexane) was drawn by vacuum into an evacuated autoclave and was followed by the specified weight of 40% sodium dispersion (percent is by weight) usually in toluene or xylene, and the remainder of the 1400 g. of solvent. The Group III–A cocatalyst was charged as a 10% solution in hexane; the amount given is the actual volume, unless otherwise stated. The cocatalyst was added after the sodium. The stirrer of the autoclave was started and the monomers, unless otherwise specified consisting of 560 g. butadiene, 70 g. isobutylene, and 70 g. vinyl toluene, having been weighed into a separate bomb, were pressured into the autoclave by applying heat to the bomb. Autoclave heaters were turned on. When the temperature reached 55° C., the reaction was continued for from about .3 to 6 hours. At the end of the reaction period, 27 g. of 50 mole percent water in methanol solution under a pressure of 100 lb./in.² was introduced into the autoclave from a small bomb. This reacted with residual sodium, evolving hydrogen. After stirring 10 min. the reaction mixture was blown out into a container. After setting overnight, the polymer solution was centrifuged. The supernatant polymer solution was decanted into round bottom flasks and the solvent was removed by vacuum evaporation at 80° C. and 10 mm. pressure. The examples follow, with variations from the "standard" procedure being mentioned.

EXAMPLES 1–16

| Ex. | Cocats. and modifiers, amount | Time of run, hrs.: mins. | Comments |
|---|---|---|---|
| 1 | TEA, 4 ml | 4:22 | 11 g. Na dispersion. |
| 2 | TEA, 1 ml | 3:06 | 43 g. Na dispersion. |
| 3 | TEA, 1 ml | 3:09 | 22 g. Na dispersion. |
| 4 | DEAC, 3 g | 2:26 | 43 g. Na dispersion. |
| 5 | DEAC, 3 g | 5:13 | 9 g. Na dispersion. |
| 6 | TEA, 5 ml | 2:34 | 10 g. Na dispersion. |
| 7 | {TEA, 8 g<br>Dodecanol, 11 g.¹} | 5:37 | 20 g. Na dispersion. |
| 8 | TEA, 4 g | 3:16 | α-Methyl styrene 105 g.; 20 g. Na dispersion (no VT). |
| 9 | TEA, 4 g | 0:21 | 36 g. Na; TEA added after heating for 1 hour. |
| 10 | TEA, 4 g | | 595 g. BD, 35 g. VT; 70 g. isobutyl 43 g: |
| 11 | TEA, 4 g | 1:50 | 595 g. BD, 11 g. Na; 35 g. α-Methyl styrene; 70 g. isobu. (no VT). |
| 12 | {Isopropanol, 8 g.¹<br>TEA, 2 g} | 2:31 | 22 g. Na dispersion |
| 13 | {Isopropanol, 8 g.¹<br>TEA, 1 g} | 3:14 | Do. |
| 14 | {TEA, 1 g<br>Dodecanol 7 g.¹} | 4:23 | Do |
| 15 | TEA, 1 g | 0:30 | 20 g. Na dispersion. |
| 16 | TEA, 1 g | 5:28 | 20 g. Na dispersion; BD only 700 g. Product had vinyl/trans ratio of 2.37, by infrared spectroscopy. |

¹ These catalyst modifiers, useful in adjusting the molecular weight of the polymer, for example, are to be distinguished from the use of large amounts of reactive solvents.

REPRESENTATIVE ANALYTICAL DATA.—EXAMPLES 1–1

| Example | Solids | F′4 vis. | P.p.m. Na | Chem. unsat. | Intrinsic viscosity dl./g |
|---|---|---|---|---|---|
| 1 | 98.7 | 4,650 | 10 | 1.48 | .374 |
| 2 | 96.8 | 3,210 | 9 | 1.46 | .387 |
| 3 | 94.9 | 937 | 6 | 1.41 | .262 |
| 4 | 98.0 | 2,965 | 36 | 1.46 | .340 |
| 5 | 98.4 | 1,982 | 10 | 1.48 | .317 |
| 7 | 98.2 | 1,153 | 13 | 1.47 | .270 |
| 8 | 87.7 | 3,093 | 623 | 1.50 | .346 |
| 9 | 95.8 | 2,940 | 40 | 1.47 | .361 |
| 10 | 96.6 | 2,344 | 12,140 | 1.49 | .296 |
| 15 | 96.5 | 234 | 9 | 1.42 | .183 |
| 16 | 98.0 | 218 | 87 | 1.60 | .183 |

The abbreviations used above have the following meanings:

Cocats.: the cocatalysts which are compounds of Group III–A metals
TEA: triethylaluminum
DEAC: diethylaluminum chloride
VT: vinyltoluene
BD: 1,3-butadiene
Isob.: isobutylene
P.P.M.: parts per million
F′4 vis.: No. 4 Ford Cup viscosity in seconds
Chem. Unsat.: Chemical Unsaturation (ICl method) in moles unsaturation per 100 g. sample

EXAMPLES 17–19

These polymerizations were conducted similarly to Examples 1–16, with the following conditions and results

| | Polymer properties | | | | | Polymerization details | | |
|---|---|---|---|---|---|---|---|---|
| Example | Solids | F′4 | P.p.m. Na in polymer | Unsat. | Intr. visc., dl./g. | g. of 40% Na disp. | Cocatalyst, g. | Preparation comments |
| 17 | 97.8 | 3,600 | <10 | 1.50 | .372 | 10 | 8 | 40 ml. 25% wt. solution of triisobutylaluminum. |
| 18 | 99.4 | 515 | <10 | 1.50 | .278 | 10 | 8 | 40 ml. 25% wt. solution of diisobutylaluminum hydride. |
| 19 | 97.8 | 475 | <10 | 1.47 | .271 | 20 | 8 | Do. |

EXAMPLE 20

The solvent, anionic catalyst, Group III–A compound cocatalyst and monomers were all charged to an autoclave at room temperautre, heated to 55–60° C., and held at this temperature until the monomers were completely reacted or the pressure no longer dropped. The monomers were butadiene, vinyltoluene, and isobutylene in the weight ratio of 75/20/5, respectively. Ten grams of a 40% sodium dispersion and 5 grams of triisobutyl aluminum were used. A slight stoichiometric excess of acetic acid in methanol quench was added and the contents heated to 90° C. for 10 minutes. Cooling, and catalyst removal by settling and centrifuging, were done before the solvent was evaporated to get the pure polymer.

The intrinsic viscosity was 0.613 dl./g. Residual sodium was 17 p.p.m.

EXAMPLES 21–22

These examples were conducted similarly to the foregoing examples, but the monomers consisted of 100 grams of an impure butadiene mixture containing about 40% butadiene and about 23% of butene-1 and 23% of isobutene. Small amounts of other impurities, also commonly present in plant butadiene, for example moisture, polymerization inhibitor, and about 0.4% acetylenes were present.

The impure butadiene of Example 22 was partially purified by passing it over pellets of potassium hydroxide and through a silica gel column. About 140 g. of vinyltoluene, 125 g. of hexane, a finely divided sodium dispersion containing 40% sodium, and triethyl aluminum were also introduced into the reactor. The results, following the same procedure as in Example 20 are as follows:

| Example No. | Grams of sodium | Grams TEA | Intrinsic viscosity, dl./g. | F4″ |
|---|---|---|---|---|
| | dispersion | | | |
| 21 | 11 | 4 | .209 | 163 |
| 22 | 20 | 4 | .238 | 597 |

EXAMPLES 23–28

The solvent (hexane, about 1400 g.), sodium or other anionic catalyst and triethylaluminum or other cocatalyst were placed in the autoclave and heated to about 80° C. The premixed monomers (about 700 g.) were charged over a period of time at such a rate that the heat of polymerization was removed by cooling water (about 30–45 minutes). Complete reaction of monomers (another 30 minutes at 80° C.) was followed by an acetic acid-methanol quench for 10 minutes, cooling, removal from the autoclave, settling of catalyst residues, centrifuging and evaporation to yield polymer. These examples include a procedure of activating the catalyst prior to combining the same with the monomer, as more particularly described in the copending application of Francis T. Wadsworth, Ser. No. 484,451, filed Sept. 1, 1965. The applicability of a variety of anionic catalysts in the present invention is of course also shown.

volatile content of between about 30% and about 60% depending upon the intrinsic viscosity of the polymer, and then deposited as a thin film upon sheet steel having a coating of electrolytically deposited tin between the polymer and the steel or iron. The coatings were in the neighborhood of 1 to 2 mils in thickness and were cured

| | Polymer properties | | | | Polymerization details | | | |
|---|---|---|---|---|---|---|---|---|
| Ex. | No. seconds in No. 4 Ford cup | η | Residual metal, p.p.m. | V/T | Alkali metal catalyst dispersion, g. | Cocatalyst Al(Et)₃, g. | Mon. data | Remarks |
| 23 | 61 | 0.069 | 21 | 1.5 | 20 v | 1 | f | HOAc, THF quench. |
| 24 | 418 | 0.196 | | 1.6 | 12 r, s | 3 | b | |
| 25 | 220 | 0.161 | 13 | 1.6 | 12 r, t | 3 | b | |
| 26 | 2,060 | 0.347 | | 1.4 | 6 r, s | 3 | b | HOAc-MeOH quench. |
| 27 | Insol. | 0.216 | <5 | 1.5 | 12 r, s | 3 | b | Do. |
| 28 | 72 | 0.103 | 11 | 1.5 | 28 r, s / 28 r, t | 1 | b | HOAc (40 g.) quench. |

NOTE.—b=75/20/5 (butadiene/vinyltoluene/isobutylene); f=75/25/0 (butadiene/vinyltoluene/isobutylene) r=50% dispersion, in decalin; s=K dispersion; t=K-Na(50-50) dispersion; u=Li dispersion; v=Na, 40% dispersion, in xylene; η=intrinsic viscosity, dl./g.; THF=tetrahydrofuran; V/T=vinyl/trans unsaturation ratio.

EXAMPLE 29

A copolymer of butadiene and vinyltoluene was prepared by a procedure similar to that used in the foregoing examples. Butadiene in the amount of 100 grams, and vinyltoluene, 35 grams, were introduced into an autoclave followed by the introduction of 30 grams of a dispersion of sodium of about 5 to 15 microns in size suspended in xylene as a suspending medium. The dispersion contained 40 parts by weight of sodium to 60 parts by weight of inert suspending medium. After introduction of the 3 grams of triethylaluminum was introduced and the reaction was conducted at 80° C. An additional 565 g. butadiene was charged over a period of 2 hours. The product was quenched with 40 g. of acetic acid and 21 g. of methanol. The No. 4 Ford Cup viscosity was 153 seconds, and the intrinsic viscosity of the recovered polymer was 0.158 dl./g. The vinyl to trans ratio was 3.3.

The foregoing and other similar polymers of a butadiene content of over about 75%, prepared by the process of the invention, have a ratio of vinyl to trans-1,4 unsaturation of between about 1.5 and 3.5. Small amounts of cis-1,4 unsaturation are also present. As used herein these terms refer to unsaturation types, and as used in the field of stereochemistry and diolefin or butadiene polymerization, designate the mode of orientation of hydrogen and carbon atoms about a carbon-to-carbon double bond as follows:

vinyl

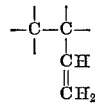

trans-1,4

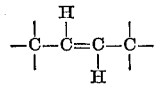

cis-1,4

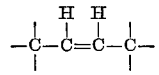

The infrared spectrometer used to analyze the polymers as to unsaturation types was a Baird-Atomic, Model 4–55.

The polymers prepared according to the invention have a variety of uses as in coating compositions, as casting resins, as elastomers, for the formation of plastic films, and various other utilities. For example, the foregoing unsaturated polymers were useful for coating metals. They were diluted with an inert solvent, to a nonby heating to a maximum temperature of 300 to 450° F. for a period of 10 minutes in the presence of oxygen or air. The coated metal could be sharply bent without damage to the coating, which also was highly resistant to solvents and chemicals such as acetic acid. Another use for the polymers is in printing inks when mixed with carbon black and/or other pigments and a dryer such as cobalt naphthenate together with a suitable solvent. When used in enamels, pigments such as titanium dioxide and/or zinc oxide with fillers such as clay or barites, conventional dryers such as lead naphthenate, cobalt naphthenate, manganese naphthenate, and conventional solvents and compounding ingredients are added, as is well known in the art.

Obvious variations and equivalents of procedures and materials of the invention as claimed will be apparent to those skilled in the art, and the claims are intended to include such variations and equivalents.

I claim:

1. In the anionic polymerization of a polymerizable unsaturated hydrocarbon monomer, the improvement which comprises the steps of
   (A) introducing the monomer into a reaction zone with from about 0.1 to 10 weight percent based upon the monomer of a catalyst-cocatalyst combination consisting essentially of (a) an anionic polymerization catalyst selected from the group consisting of (i) metals of Group I–A, and (ii) metals of Group II–A, and (b) a cocatalyst selected from the group consisting of (i) organometallic compounds of the metals of Group III–A, and (ii) hydrides of the metals of Group III–A, wherein molar ratio of cocatalyst to catalyst is less than 1 to 1;
   (B) subjecting the materials contained in the reaction zone to polymerization conditions in a temperature range of from −20° C., to 250° C. and a pressure range of from about 1 to 20 atmospheres until a preponderant proportion of the monomer is converted to solid polymer; and
   (C) recovering the polymer.

2. In the anionic polymerization of a polymerizable unsaturated hydrocarbon monomer, the improvement which comprises the steps of
   (A) introducing the monomer into a reaction zone together with from 0.1 to 10 weight percent based upon the monomer of a catalyst-cocatalyst combination consisting essentially of (a) an anionic polymerization catalyst selected from the group of metallic sodium and organosodium compounds; and
   (b) a cocatalyst selected from the group consisting of (i) organometallic compounds of the metals of Group III–A, and (ii) hydrides of the metals of Group III-A, wherein the molar ratio of cocatalyst to catalyst is less than 1 to 1;

(B) subjecting the material contained in the reaction zone to polymerization conditions in a temperature range of from −20° C., to 250° C. and a pressure range of from about 1 to 20 atmospheres until a preponderant proportion of the monomer is converted to solid polymer; and (C) recovering the polymer.

3. The process of claim 2, wherein the cocatalyst is selected from the group consisting of (i) organometallic compounds of aluminum and (ii) hydrides of aluminum.

4. In the anionic polymerization of an open chain diolefin having conjugated unsaturation, the improvement which comprises the steps of (A) introducing the monomer into a reaction zone together with from about 0.1 to 10 weight percent based upon the monomer of a catalyst-cocatalyst combination consisting essentially of (a) metallic sodium, and (b) a compound of the formula $R_3Al$, wherein R is a hydrocarbyl radical having less than about 20 carbon atoms, as the cocatalyst, wherein the molar ratio of cocatalyst to catalyst is in the range from about 1 to 6, to about 1 to 100.

(B) subjecting the materials contained in the reaction zone to polymerization in a temperature range of from −20° C. to 250° C., and a pressure range of from about 1 to 20 atmospheres until a preponderant proportion of the monomer is converted to solid polymer; and (C) recovering the polymer.

5. The process of claim 4, wherein the monomer consists essentially of butadiene, isobutylene, and vinyl toluene, the alkali metal anionic polymerization catalyst is metallic sodium, and the compound of the formula $R_3Al$ is a trialkyl aluminum.

References Cited

UNITED STATES PATENTS 3,143,538   8/1964   Robertson _____ 260—94.3
3,278,508   10/1966  Kahle et al. _____ 260—94.3

JAMES A. SEIDLECK, Primary Examiner

R. A. GAITHER, Assistant Examiner

U.S. Cl. X.R.

252—431; 260—2, 67, 78, 78.4, 80, 80.78, 83.3, 83.7, 85.3, 88.7, 89.5, 92.1, 93.5, 93.7, 94.1, 94.2, 94.9, 879, 880